United States Patent
Kwon

(10) Patent No.: US 11,546,190 B2
(45) Date of Patent: Jan. 3, 2023

(54) METHOD AND APPARATUS FOR CONTROLLING COMMUNICATION FOR ISOLATING NETWORK

(71) Applicant: ARAD NETWORKS, Daejeon (KR)

(72) Inventor: Young Min Kwon, Gyeonggi-do (KR)

(73) Assignee: ARAD NETWORKS, Daejeon (KR)

( * ) Notice: Subject to any disclaimer, the term of this patent is extended or adjusted under 35 U.S.C. 154(b) by 0 days.

(21) Appl. No.: 17/395,219

(22) Filed: Aug. 5, 2021

(65) Prior Publication Data

US 2022/0286322 A1 Sep. 8, 2022

(30) Foreign Application Priority Data

Mar. 2, 2021 (KR) .......................... 10-2021-0027598

(51) Int. Cl.
*H04L 12/46* (2006.01)
*H04L 9/40* (2022.01)

(52) U.S. Cl.
CPC ...... *H04L 12/4633* (2013.01); *H04L 12/4645* (2013.01); *H04L 63/0272* (2013.01)

(58) Field of Classification Search
CPC ............ H04L 12/4633; H04L 12/4645; H04L 63/0272
See application file for complete search history.

(56) References Cited

U.S. PATENT DOCUMENTS

| | | | |
|---|---|---|---|
| 11,159,366 B1* | 10/2021 | Gawade | H04L 41/0895 |
| 11,316,822 B1* | 4/2022 | Gawade | G06F 11/2025 |
| 2020/0073692 A1* | 3/2020 | Rao | H04L 41/0893 |
| 2021/0006596 A1* | 1/2021 | Beredimas | G06F 21/567 |
| 2022/0210113 A1* | 6/2022 | Pillareddy | H04L 61/5038 |

FOREIGN PATENT DOCUMENTS

| | | |
|---|---|---|
| KR | 10-2017-0117565 A | 10/2017 |
| KR | 10-1806376 B1 | 12/2017 |
| KR | 10-2018-0104377 A | 9/2018 |
| KR | 10-2020-0064102 A | 6/2020 |

* cited by examiner

*Primary Examiner* — Mohamed A. Wasel
(74) *Attorney, Agent, or Firm* — Nicholas Park

(57) ABSTRACT

A communication control method performed by a controller may include receiving, from at least one of a first user terminal and a second user terminal, a network generation request for a first network that connects the first user terminal and the second user terminal, in response to the network generation request, transmitting a first network namespace generation request corresponding to at least one of the first user terminal and the second user terminal to a gateway, and when a first network namespace is generated in the gateway in response to the first network namespace generation request, transmitting information about a first virtual interface to be allocated to the first network namespace to the gateway.

6 Claims, 9 Drawing Sheets

[FIG. 1]
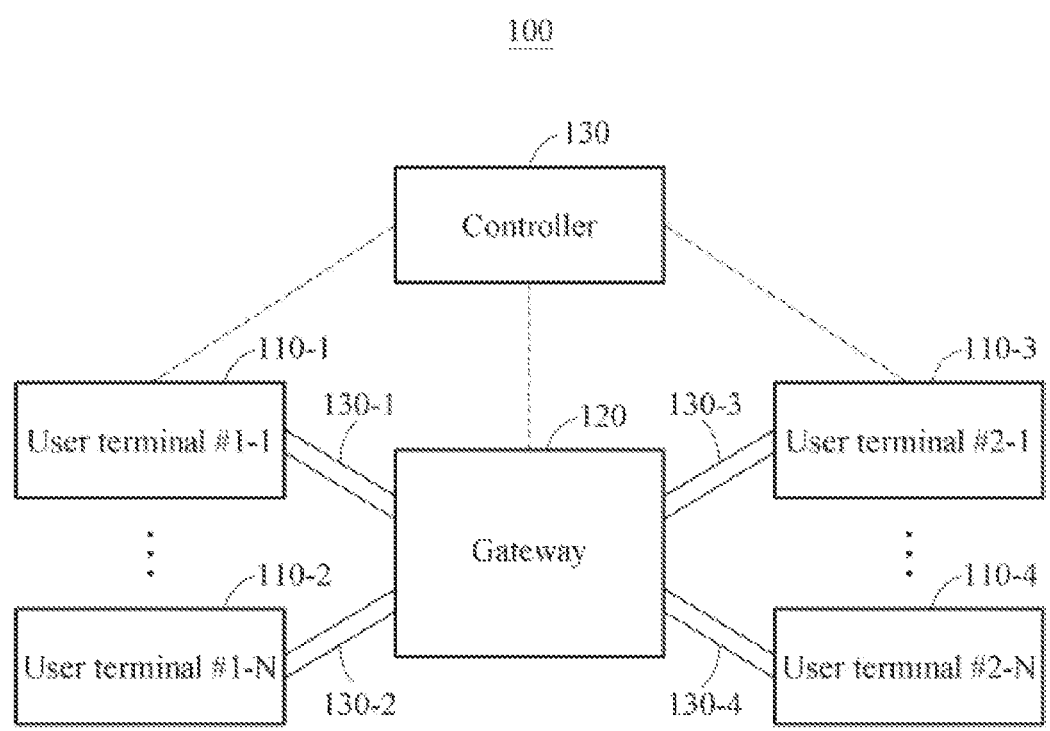

[FIG. 2]
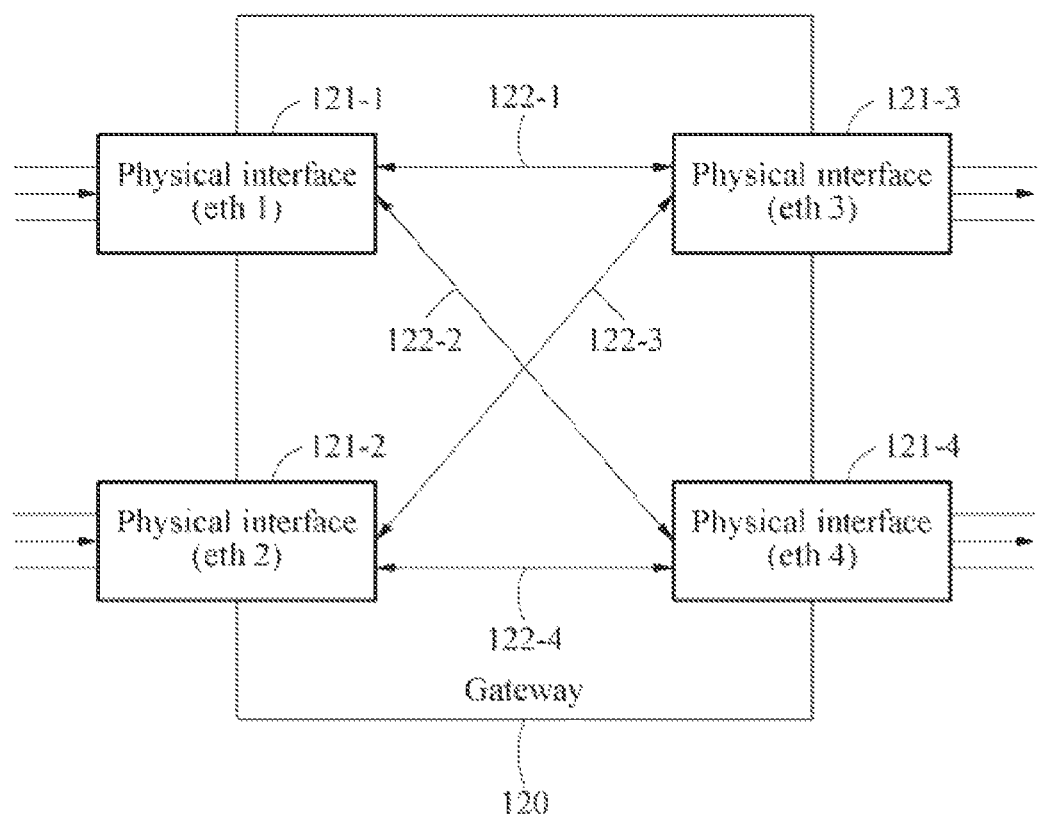

[FIG. 3]
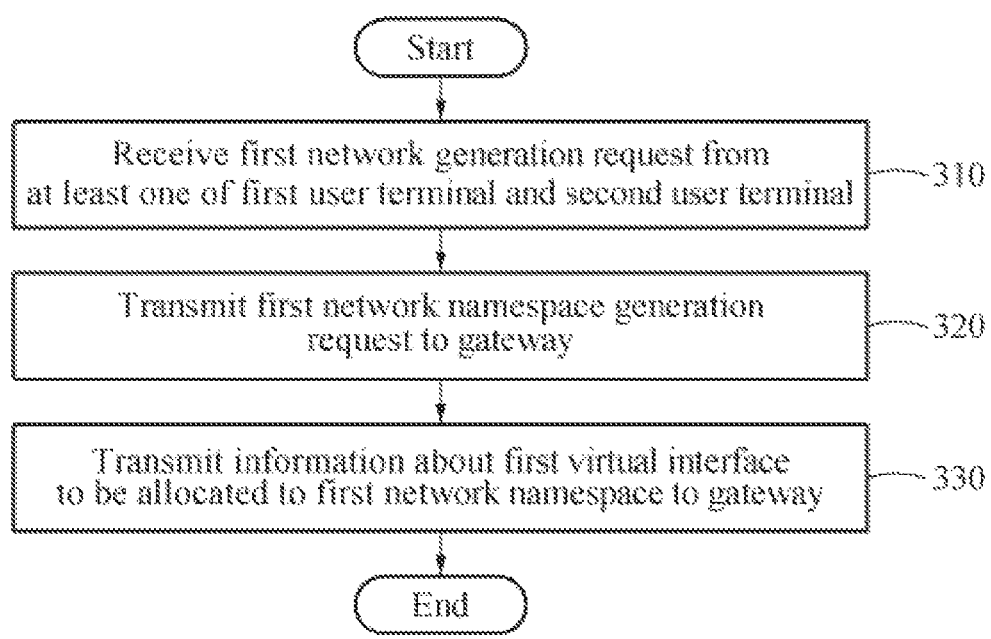

[FIG. 4]
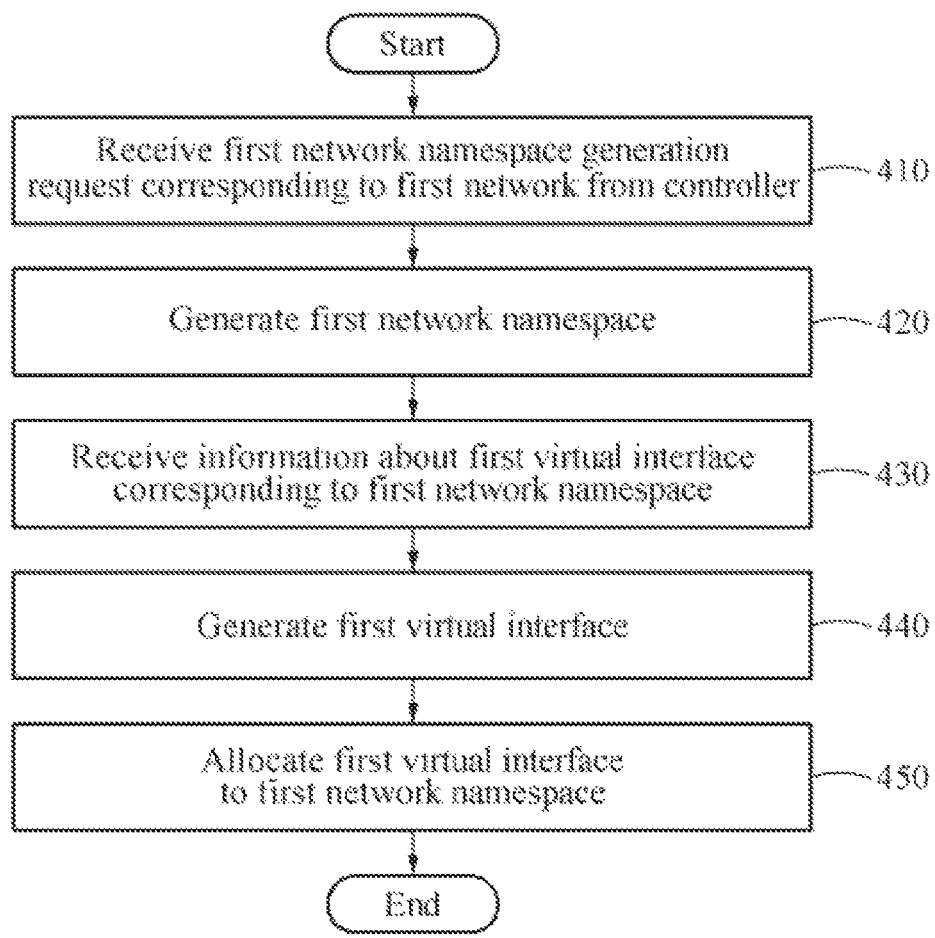

[FIG. 5A]
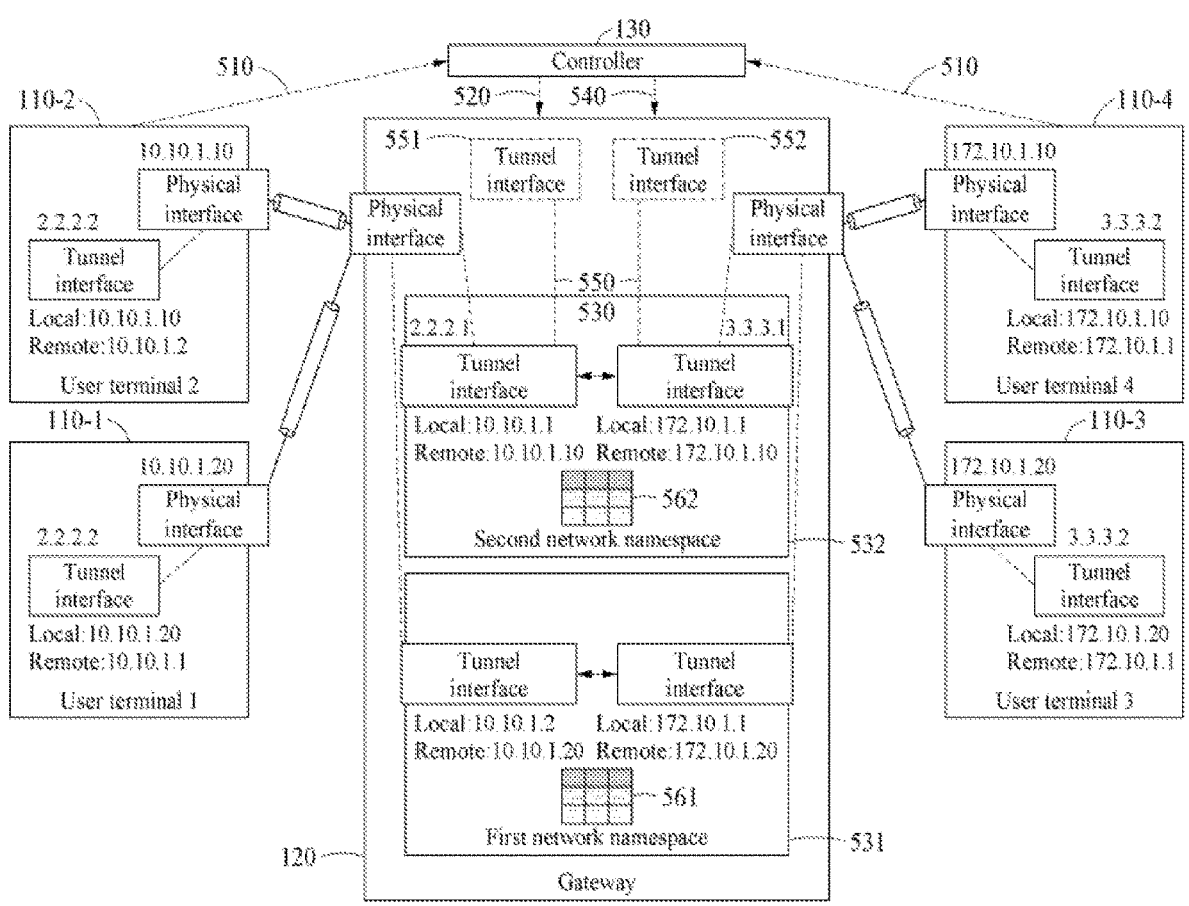

[FIG. 5B]
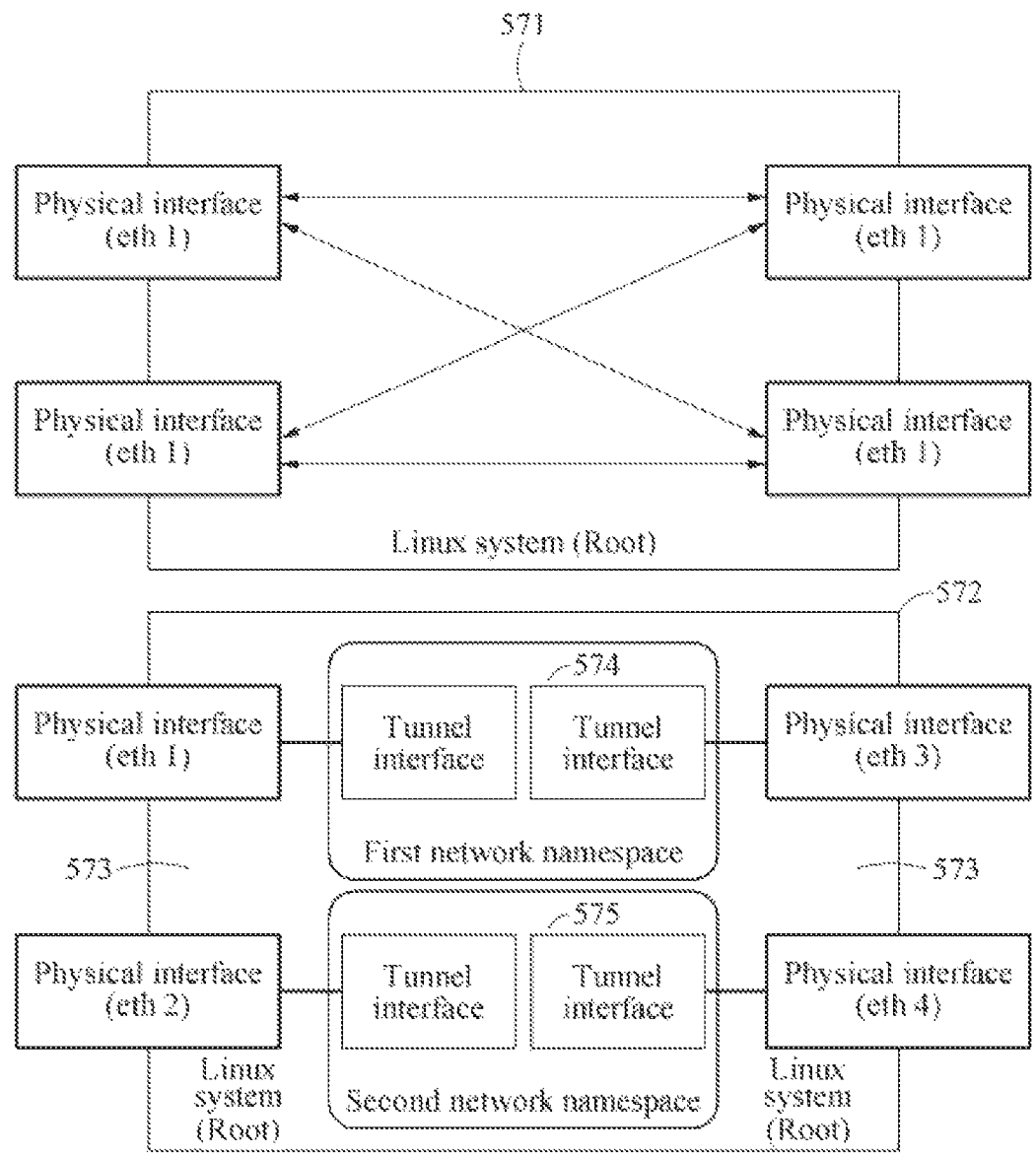

[FIG. 5C]
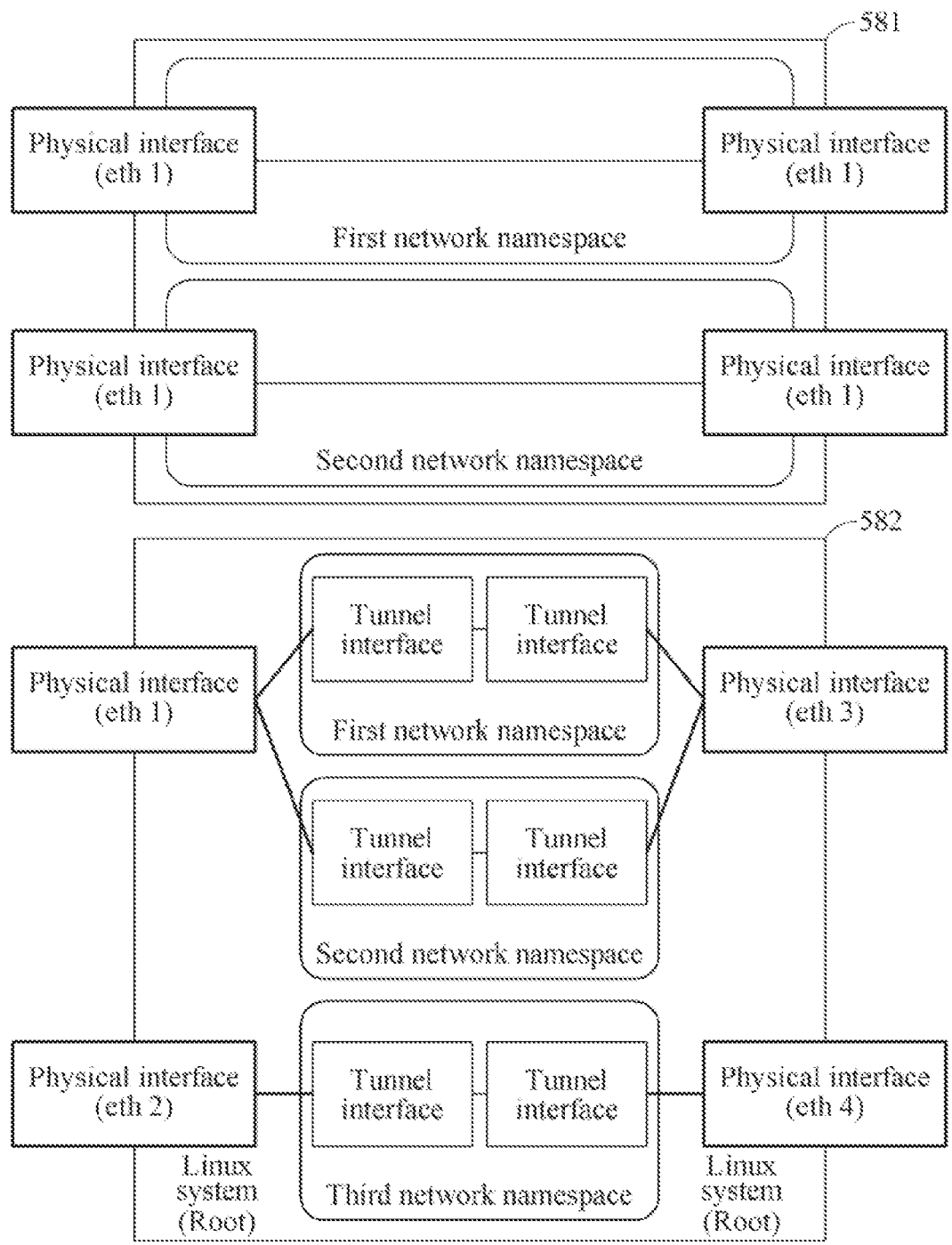

[FIG. 6]
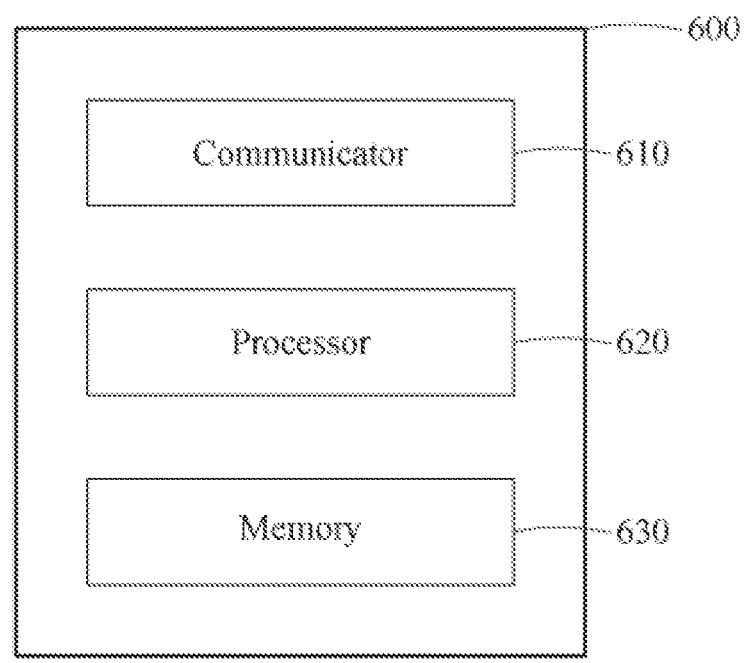

[FIG. 7]
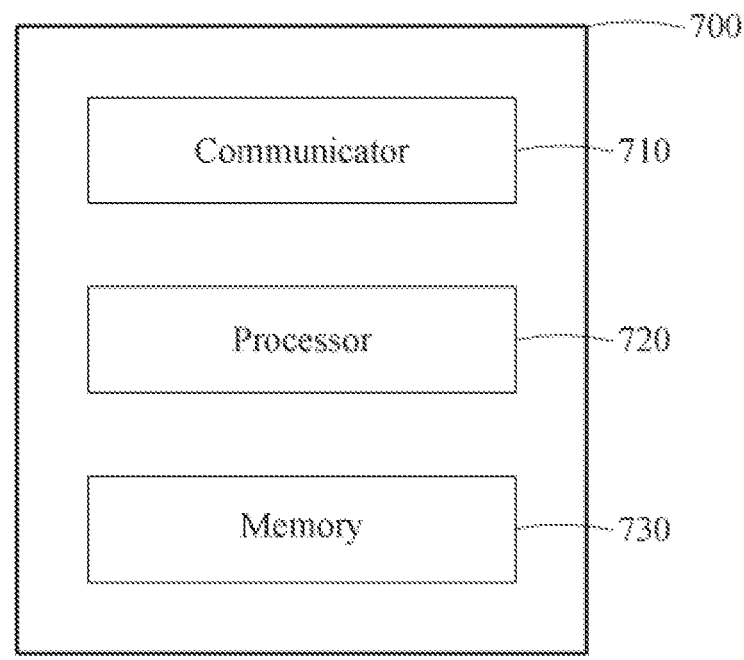

METHOD AND APPARATUS FOR CONTROLLING COMMUNICATION FOR ISOLATING NETWORK

CROSS-REFERENCE TO RELATED APPLICATION(S)

This application claims priority from and the benefit of Korean Patent Application No. 10-2021-0027598 filed on Mar. 2, 2021, which is hereby incorporated by reference in its entirety.

BACKGROUND

1. Field

The present disclosure of the following description relates to a communication control method and apparatus for isolating a network.

2. Related Art

Tunneling refers to a method of forming a virtual link between nodes or networks and may be implemented by applying encapsulation in which a single protocol wraps another protocol to a data packet. Encapsulation and decapsulation may be performed through a virtual tunnel interface and an encapsulated data packet may be transmitted and received through a network tunnel formed between two nodes. Security of communication may be provided through encapsulation on a data packet.

In a general Linux system, a network may be a global resource that is uniquely present. All the accounts(Users in a Linux system) share network-related elements, such as a network interface and a routing table. Therefore, when network information is changed through a single account (user), for example, when a routing table is changed, it may affect the entire system. When a network namespace is generated, a network configuration may be independently managed for each network namespace. For example, a configuration change in any one network namespace does not affect other network namespaces distinct from the network namespace. Therefore, a network configuration may be independently managed for each network namespace.

SUMMARY

Characteristic constitutions of the disclosure to accomplish the aforementioned objectives and to achieve characteristic effects of the disclosure are as follows.

A communication control method performed by a controller according to an example embodiment may include receiving, from at least one of a first user terminal and a second user terminal, a first network generation request for a first network that connects the first user terminal and the second user terminal; in response to the first network generation request, transmitting a first network namespace generation request corresponding to at least one of the first user terminal and the second user terminal to a gateway; and when a first network namespace is generated in the gateway in response to the first network namespace generation request, transmitting information about a first virtual interface to be allocated to the first network namespace to the gateway.

The first virtual interface may be a (1-3)-th tunnel interface corresponding to at least one of a (1-1)-th tunnel interface generated in the first user terminal and a (1-2)-th tunnel interface generated in the second user terminal.

The communication control method according to an example embodiment may further include, when receiving, from at least one of a third user terminal and a fourth user terminal, a second network generation request for a second network that connects the third user terminal and the fourth user terminal, transmitting a second network namespace generation request corresponding to at least one of the third user terminal and the fourth user terminal to the gateway; and when a second network namespace is generated in the gateway, transmitting information about a second virtual interface to be allocated to the second network namespace to the gateway. Here, the first network namespace and the second network namespace may be mutually distinct namespaces.

The second virtual interface may be a (2-3)-th tunnel interface corresponding to at least one of a (2-1)-th tunnel interface generated in the third user terminal and a (2-2)-th tunnel interface generated in the fourth user terminal.

The communication control method according to an example embodiment may further include providing a first routing table corresponding to the first network namespace to the gateway. The first routing table may be allocated to the first network namespace.

A communication control method performed by a gateway according to an example embodiment may include receiving, from a controller, a first network namespace generation request corresponding to a first network that connects a first user terminal and a second user terminal; in response to the first network namespace generation request, generating a first network namespace; receiving, from the controller, information about a first virtual interface corresponding to the first network namespace; generating the first virtual interface; and allocating the first virtual interface to the first network namespace.

A controller for performing a communication control method according to an example embodiment may include a communicator; and a processor. The processor is configured to receive, from at least one of a first user terminal and a second user terminal, a network generation request corresponding to a first network that connects the first user terminal and the second user terminal; in response to the received network generation request, transmit a first network namespace generation request corresponding to the first user terminal and the second user terminal to a gateway, and when a first network namespace is generated in the gateway in response to the first network namespace generation request, transmit information about a first virtual interface to be allocated to the first network namespace to the gateway.

A gateway for performing a communication control method according to an example embodiment may include a communicator; and a processor. The processor is configured to receive, from a controller, a first network namespace generation request corresponding to a first network that connects a first user terminal and a second user terminal, in response to the first network namespace generation request, generate a first network namespace, receive, from the controller, information about a first virtual interface corresponding to the first network namespace, generate the first virtual interface, and allocate the first virtual interface to the first network namespace.

Further areas of applicability will become apparent from the description provided herein. The description and specific examples in this summary are intended for purposes of illustration only and are not intended to limit the scope of the disclosure.

BRIEF DESCRIPTION OF THE FIGURES

Example embodiments will be described in more detail with reference to the following figures that are simply a portion of the example embodiments and one of ordinary skill in the art to which this disclosure pertains may readily acquire other figures based on the figures without an inventive work being made:

FIG. 1 illustrates an example of a communication system according to an example embodiment;

FIG. 2 illustrates an example of a configuration of a gateway according to an example embodiment;

FIG. 3 is a flowchart illustrating an example of a communication control method performed by a controller of a communication system according to an example embodiment;

FIG. 4 is a flowchart illustrating an example of a communication control method performed by a gateway of a communication system according to an example embodiment;

FIG. 5A illustrates an implementation example of a communication control method according to an example embodiment;

FIG. 5B illustrates an example of effect provided based on a communication control method according to an example embodiment;

FIG. 5C illustrates an example of effect provided based on a communication control method according to an example embodiment;

FIG. 6 is a diagram illustrating an example of a configuration of a controller according to an example embodiment; and FIG. 7 is a diagram illustrating an example of a configuration of a gateway according to an example embodiment.

DETAILED DESCRIPTION

The following detailed description of this disclosure is described with reference to the accompanying drawings in which specific example embodiments of the disclosure are illustrated as examples, to fully describe purposes, technical solutions, and advantages of the disclosure. The example embodiments are described in detail enough for one of ordinary skill in the art to carry out the disclosure.

Also, the terms "comprises/includes" used throughout the detailed description and the claims and modifications thereof are not intended to exclude other technical features, additions, components, or operations. Also, "single" or "one" is used to indicate at least one and "another" is limited to at least second or more.

One of ordinary skill in the art may clearly understand a portion of other purposes, advantages, and features of the disclosure from this specification and another portion thereof from implementations of the disclosure. The following examples and drawings are provided as examples only and not to limit the disclosure. Therefore, the detailed description disclosed herein should not be interpreted as a limiting meaning with respect to a specific structure or function and should be interpreted as representative basic data that provides guidelines such that one of ordinary skill in the art may variously implement the disclosure as substantially suitable detailed structures.

Further, the disclosure may include any possible combinations of example embodiments described herein. It should be understood that, although various example embodiments differ from each other, they do not need to be exclusive. For example, a specific shape, structure, and feature described herein may be implemented as another example embodiment without departing from the spirit and scope of the disclosure. Also, it should be understood that a position or an arrangement of an individual component of each disclosed example embodiment may be modified without departing from the spirit and scope of the disclosure. Accordingly, the following detailed description is not to be construed as being limiting and the scope of the disclosure, if properly described, is limited by the claims, their equivalents, and all variations within the scope of the claims. In the drawings, like reference numerals refer to like elements throughout.

Unless the context clearly indicates otherwise, the singular forms "a," "an," and "the," are intended to include the plural forms as well. Also, when description related to a known configuration or function is deemed to render the present disclosure ambiguous, the corresponding description is omitted.

Hereinafter, the example embodiments are described in detail with reference to the accompanying drawings such that one of ordinary skill in the art may easily perform the example embodiments.

FIG. 1 illustrates an example of a communication system according to an example embodiment.

Referring to FIG. 1, a communication system 100 may include user terminals 110-1, . . . , 110-4 each corresponding to an edge node that is an individual entity serving as a communication entity, a gateway 120 configured to relay transmission and reception of a data packet between the user terminals 110-1, . . . , 110-4, and a controller 130 configured to control the user terminals 110-1, . . . , 110-4 and the gateway 120.

The communication system 100 may provide a means capable of performing isolated network-based communication to each of the user terminals 110-1, . . . , 110-4. In detail, by isolating a network A for transmitting and receiving a data packet between the user terminal #1-1 110-1 and the user terminal #2-1 110-3 and a network B for transmitting and receiving a data packet between the user terminal #1-N 110-2 and the user terminal #2-N 110-4, interference between the network A and the network B may be prevented. Through this, although the network A is externally exposed, the network B may maintain the security. Also, since the network A and the network B are mutually isolated, the same IP may be assigned to the user terminal #1-1 110-1 and the user terminal #1-N 110-2. Through this, the communication system 100 may provide a mean capable of further effectively using a network resource and may provide a communication method with enhanced security. Although a situation in which the user terminals 110-1, . . . , 110-4 perform communication based on a one-to-one connection is described, the user terminals 110-1, . . . , 110-4 may perform communication through arbitrary connection, such as 1:N and N:1. It will be understood by one of ordinary skill in the art that a network for performing communication may be configured in variously isolated forms according to use cases.

According to an example embodiment, the user terminals 110-1, . . . , 110-4 may include any terminal capable of performing network communication, such as, for example, a mobile phone, an Internet of things (IoT) terminal, a personal computer (PC), a laptop computer, and a server device. Transmission and reception of a data packet between the user terminals 110-1, . . . , 110-4 may be performed through the gateway 120. Elements provided as types of the user terminals 110-1, . . . , 110-4 are provided as an example only and the example embodiment is not limited thereto.

The controller 130 may control communication between the user terminals 110-1, . . . , 110-4 based on configuration information including connection information, routing information, and network interface information between the user terminals 110-1, . . . , 110-4. The controller 130 may perform an authentication process, for example, an ID/PW method, on the individual user terminals 110-1, . . . , 110-4 before generating a network between the user terminals 110-1, . . . , 110-4 and may provide network security by allowing a network to be formed between the authenticated user terminals 110-1, . . . , 110-4.

According to an example embodiment, the communication system 100 may improve security of a network by allowing a data packet to be transmitted and received through a network tunnel 130-1, 130-2, 130-3, 130-4 formed between the user terminal 110-1, 110-2, 110-3, 110-4 and the gateway 120. A packet transmitted and received through the network tunnel 130-1, 130-2, 130-3, 130-4 is an encapsulated packet. Here, in response to access from an outside to a communication path corresponding to the network tunnel 130-1, 130-2, 130-3, 130-4, only an encapsulated packet may be verified and stability may be provided against external hacking. For example, a data packet transmitted from the user terminal #1-1 110-1 to the user terminal #2-1 110-3 may be transmitted to the gateway 120 through the network tunnel 130-1 and a data packet from the gateway 120 may be transmitted to the user terminal #2-1 110-3 through the network tunnel 130-3. In this case, in response to access from an outside to a communication path corresponding to the network tunnel 130-1, 130-3, only an encapsulated data packet may be verified and security may be improved accordingly.

FIG. 2 illustrates an example of a configuration of a gateway according to an example embodiment. Referring to FIG. 2, the gateway 120 may include physical interfaces 121-1, 121-2, 121-3, and 121-4 each connected to an external entity. The gateway 120 may receive a data packet from an outside or may transmit a data packet to the outside through the physical interface 121-1, 121-2, 121-3, 121-4.

As described above, a data packet to be transmitted to the gateway 120 may be transmitted through a network tunnel. Decapsulation may be performed in the gateway 120.

When a data packet is transmitted to a destination of an outside, encapsulation may be performed again and the encapsulated data packet may be transmitted to the destination through a network tunnel.

The gateway 120 may be implemented as a Linux system. All the data packets transmitted and received in the gateway can be monitored in a general Root authority status. Therefore, in response to access to the gateway 120 of the communication system 100, data packets 122-1, 122-2, 122-3, and 122-4 transmitted and received between the user terminals 110-1, . . . , 110-4 may be verified and a vulnerability issue to hacking may occur. Accordingly, there may be a need for a method of enhancing security by isolating a network in the gateway 120 to disallow access from the outside to the data packets 122-1, 122-2, 122-3, and 122-4 transmitted and received between the user terminals 110-1, . . . , 110-4.

A communication control method according to an example embodiment may provide a method capable of performing an isolated end-to-end communication between the user terminals 122-1, 122-2, 122-3, and 122-4 and, at the same time, providing enhanced security by assigning a different network namespace for each network formed between the user terminals 122-1, 122-2, 122-3, and 122-4 and by allocating a corresponding tunnel interface, for example, a virtual interface, to each network namespace. The virtual interface used herein may refer to an interface that is defined in a software manner, which differs from the physical interface.

FIG. 3 is a flowchart illustrating an example of a communication control method performed by a controller of a communication system according to an example embodiment.

Referring to FIG. 3, in operation 310, the controller may receive, from at least one of a first user terminal and a second user terminal, a first network generation request corresponding to a first network that connects the first user terminal and the second user terminal. The first network may be a network for end-to-end communication between the first user terminal and the second user terminal. Since the first network is a network isolated from a network formed between other user terminals, interference with another network may not occur. Accordingly, an IP address assigned to the first user terminal in the first network may be used again in another user terminal in another network. Network isolation based on a virtual interface and a network namespace described herein may refer to logical network isolation implemented by software.

In operation 320, in response to the first network generation request, the controller may transmit a first network namespace generation request corresponding to the first user terminal and the second user terminal to the gateway.

In operation 330, when a first network namespace is generated in the gateway in response to the first network namespace generation request, the controller may transmit information about first virtual interface to be allocated to the first network namespace to the gateway.

The first virtual interface may be a (1-3)-th tunnel interface corresponding to at least one of a (1-1)-th tunnel interface generated in the first user terminal and a (1-2)-th tunnel interface generated in the second user terminal. In detail, a tunnel interface may refer to an arbitrary interface that applies a tunneling scheme through encapsulation on a data packet or decapsulation on an encapsulated data packet. For example, the tunnel interface may apply a tunneling scheme, such as an IP over IP (IPIP) tunnel, a simple Internet transition (SIT) tunnel, a generic routing encapsulation (GRE), a foo-over-UDP (FOU), a generic UDP encapsulation (GUE), a generic network virtualization encapsulation (GENEVE), and the like. However, one of ordinary skill in the art may understand that the tunneling scheme is not limited thereto. The (1-3)-th tunnel interface may be a tunnel interface corresponding to the (1-1)-th tunnel interface and the (1-2)-th tunnel interface that are respectively generated in the first user terminal and the second user terminal present at both ends of the first network. Through this, data packet transmission and reception between the first user terminal and the second user terminal may be performed through a network tunnel formed between the first user terminal and the second user terminal.

According to an example embodiment, when receiving a second network generation request corresponding to a second network distinct from the first network, the controller may generate the second network based on a second network namespace distinct from the first network namespace. In detail, when receiving, from at least one of a third user terminal and a fourth user terminal, the second network generation request for the second network that connects the third user terminal and the fourth user terminal, the controller may transmit a second network namespace generation request corresponding to the second network to the gateway. When the second network namespace is generated in the gateway, the controller may transmit information about a second virtual interface to be allocated to the second network namespace to the gateway. The second virtual interface may be a (2-3)-th tunnel interface corresponding to at least one of a (2-1)-th tunnel interface generated in the third user terminal and a (2-2)-th tunnel interface generated in the fourth user terminal. Through the (2-1)-th tunnel interface to the (2-3)-th tunnel interface, the third user terminal and the fourth user terminal may perform communication through the second network based on the network tunnel. The second network may be isolated from the first network (logical isolation through software) such that they do not affect each other. According to the aforementioned example embodiment, one of ordinary skill in the art may understand that the third user terminal may be a user terminal distinct from the first user terminal or a user terminal identical to the first user terminal.

The controller may provide a first routing table corresponding to the first network namespace to the gateway. The gateway may add the first routing table to an inside of the first network namespace. Likewise, the controller may provide a second routing table corresponding to the second network namespace to the gateway, and the second routing table may be added to an inside of the second network namespace. The communication system may provide independent communication based on the first routing table and the second routing table distinct for the first network and the second network, respectively.

Also, when a new network is generated, the controller may generate an isolated network without limitation on a number of isolated networks to be generated by generating a network namespace through the aforementioned scheme and may provide the isolated network to a connected user terminal without a restriction. Also, when network connection between user terminals is terminated, load of the gateway may be decreased by removing a network namespace.

FIG. 4 is a flowchart illustrating an example of a communication control method performed by a gateway of a communication system according to an example embodiment.

Referring to FIG. 4, in operation 410, the gateway may receive, from a controller, a first network namespace generation request corresponding to a first network that connects a first user terminal and a second user terminal.

In operation 420, in response to the first network namespace generation request, the gateway may generate a first network namespace. In operation 430, the gateway may receive, from the controller, information about a first virtual interface corresponding to the first network namespace.

In operation 440, the gateway may generate the first virtual interface. In operation 450, the gateway may allocate the first virtual interface to the first network namespace. The first virtual interface may be a (1-3)-th tunnel interface corresponding to at least one of a (1-1)-th tunnel interface generated in the first user terminal and a (1-2)-th tunnel interface generated in the second user terminal. As described above with reference to FIG. 3, the gateway may provide a network isolated based on the network tunnel using the (1-1)-th tunnel interface to the (1-3)-th tunnel interface.

When receiving, from the controller, a second network namespace generation request corresponding to a second network that connects a third user terminal and a fourth user terminal, the gateway may generate a second network namespace in response to the second network namespace generation request and may further receive, from the controller, information about a second virtual interface corresponding to the second network namespace. The gateway may generate the second virtual interface and may allocate the second virtual interface to the second network namespace. The first network namespace and the second network namespace may be mutually distinct network namespaces.

The gateway may receive, from the controller, a first routing table corresponding to the first network namespace and may allocate the first routing table to the first network namespace, and may receive, from the controller, a second routing table corresponding to the second network namespace and may allocate the second routing table to the second network namespace. Through this, the second network isolated from the first network may be generated and each user terminal may perform communication through each corresponding network.

FIG. 5A illustrates an implementation example of a communication control method according to an example embodiment.

Referring to FIG. 5A, the gateway 120 may generate a different network namespace for each isolated network and may allocate a tunnel interface corresponding thereto. In detail, FIG. 5A illustrates an example in which a second network including the user terminal 2 110-2 and the user terminal 4 110-4 as both ends is generated in a situation in which a first network including the user terminal 1 110-1 and the user terminal 3 110-3 as both ends is pre-generated. The controller 130 may include network-related configuration information, for example, network namespace ID information, connection information between user terminals, and routing information. When receiving a generation request for the second network isolated from the first network from at least one of the user terminal 2 110-2 and the user terminal 4 110-4 in operation 510, the controller 130 may transmit a network namespace generation request corresponding to the second network to the gateway 120 in operation 520. In operation 530, the gateway 120 may generate a second network namespace 532 in response to the request from the controller 130. The second network namespace 532 may be a network namespace distinct from a first network namespace 531 corresponding to the first network that is a network generated for the user terminal 1 110-1 and the user terminal 3 110-3.

In operation 540, the controller 130 may transmit, to the gateway 120, i) information used to generate a tunnel interface, ii) information about a network namespace to which the tunnel interface to be generated is to be allocated, and iii) routing information corresponding to the network namespace.

In operation 550, the gateway 120 may generate tunnel interfaces 551 and 552 based on information received from the controller 130 and may allocate the same to the second network namespace 532.

In operation 560, the gateway 120 may allocate the routing table 562 received from the controller 130 to the second network namespace 532. The second network may be operated independently from the first network through a second routing table 562 distinct from a first routing table 561.

FIG. 5B illustrates an example of effect provided based on a communication control method according to an example embodiment.

In the case of a gateway 571 not isolated by a network namespace, all of data packets transmitted and received within a system may be verified, which may lead to degrading a security.

On the contrary, in the case of a gateway 572 of the disclosure in which a different network namespace is assigned for each network, an encapsulated data packet may be verified in an area 573 accessible through a root authority and an original data packet may not be verified from an outside. Therefore, to verify the original data packet, for example, a data packet decapsulated through a tunnel interface, an additional authority for accessing each of a first network namespace 574 and a second network namespace 575 is required. Therefore, the communication control method according to an example embodiment may provide a further enhanced security. That is, although the gateway 572 is hacked from an outside, the additional authority to access each of the first network namespace 574 and the second network namespace 575 is required to verify a decapsulated data packet. Therefore, the communication control method according to an example embodiment may provide a further enhanced security.

FIG. 5C illustrates an example of effect provided based on a communication control method according to an example embodiment.

Referring to FIG. 5C, in principle, a network interface may be allocated to a single network namespace. In a gateway 581 that does not use a tunnel interface corresponding to a virtual network, each physical interface may be allocated to a single namespace and only two isolated networks can be generated accordingly. That is, in the existing gateway 581, a number of isolated networks to be generated may be restricted based on a number of physical interfaces.

In a gateway 582 to which the communication control method according to an example embodiment applies, a tunnel interface corresponding to a virtual interface may be allocated to each network namespace and an unlimited number of isolated networks may be generated.

FIG. 6 illustrates an example of a configuration of a controller according to an example embodiment.

Referring to FIG. 6, a controller 600 according to an example embodiment may include a communicator 610 configured to communicate with an external entity, a processor 620, and a memory 630.

The communicator 610 may operate under control of the processor 620. The communicator 610 may transmit a single in a wired communication manner or a wireless communication manner in response to a command from the processor 620. The communicator 610 may communicate with an external apparatus, for example, a server and a gateway, in the wireless communication manner or the wired communication manner. The communicator 610 may transmit and receive a request and a response to and from interacting another computing apparatus. For example, the request and the response may be implemented through the same transmission control protocol (TCP) session. However, it is provided as an example only. For example, the request and the response may be transmitted and received as a user datagram protocol (UDP) datagram.

The processor 620 may execute a program command stored in the memory 630. The processor 620 may refer to a dedicated processor configured to perform the methods according to the example embodiments, such as, for example, a central processing unit (CPU). The memory 630 may be configured as a volatile storage medium and/or a non-volatile storage medium. For example, the memory 630 may include a read only memory (ROM) and/or a random access memory (RAM). Also, the processor 620 may include a hardware component, such as, for example, a micro processing unit (MPU), a CPU or a tensor processing unit (TPU), a cache memory, and a data bus. Also, the processor 620 may further include a software component of an application that performs a specific purpose and an operating system (OS).

The processor 620 may receive, from at least one of a first user terminal and a second user terminal, a first network generation request corresponding to a first network that connects the first user terminal and the second user terminal, in response to the received first network generation request, transmit a first network namespace generation request corresponding to the first user terminal and the second user terminal to a gateway, and when a first network namespace is generated in the gateway in response to the first network namespace generation request, transmit information about a first virtual interface to be allocated to the first network namespace to the gateway. One of ordinary skill in the art may understand that the processor 620 may perform the aforementioned operation of the controller 600.

The configuration of the controller 600 described with reference to FIG. 6 is provided as an example only and the example embodiment is not limited thereto. For example, the controller 600 may further include other components in addition to the components of FIG. 6. For example, the controller 600 may further include an input interface and an output interface.

FIG. 7 is a diagram illustrating an example of a configuration of a gateway according to an example embodiment.

Referring to FIG. 7, a gateway 700 may include a communicator 710 configured to communicate with an external entity, a processor 720, and a memory 730.

The communicator 710 may operate under control of the processor 720. The communicator 710 may transmit a signal in a wired communication manner or a wireless communication manner in response to a command from the processor 720. The communicator 710 may communicate with an external device, for example, a user terminal and a controller, in the wired communication manner or the wired communication manner. The communicator 710 may transmit and receive a request and a response to and from interacting another computing apparatus. For example, the request and the response may be implemented through the same TCP session. However, it is provided as an example only. For example, the request and the response may be transmitted and received as a UDP datagram.

The processor 720 may execute a program command stored in the memory 730. The processor 720 may refer to a dedicated processor configured to perform the methods according to the example embodiments, such as, for example, a CPU. The memory 730 may be configured as a volatile storage medium and/or a non-volatile storage medium. For example, the memory 730 may be configured as a ROM and/or a RAM. Also, the processor 720 may include a hardware component, such as, for example, an MPU, a CPU or a TPU, a cache memory, and a data bus. Also, the processor 720 may further include a software component of an application that performs a specific purpose and an OS.

The processor 720 may receive, from a controller, a first network namespace generation request corresponding to a first network that connects a first user terminal and a second user terminal, in response to the first network namespace generation request, generate a first network namespace, receive, from the controller, information about a first virtual interface corresponding to the first network namespace, generate the first virtual interface, and allocate the first virtual interface to the first network namespace. One of ordinary skill in the art may understand that the 720 may perform the aforementioned operation of the gateway 700.

The configuration of the gateway 700 described with reference to FIG. 7 is provided as an example only and the example embodiment is not limited thereto. For example, the gateway 700 may further include other components in addition to the components of FIG. 7. For example, the gateway 7 may further include an input interface and an output interface.

One of ordinary skill in the art may easily understand that the methods and/or processes and operations described herein may be implemented using hardware components, software components, or a combination thereof based on the example embodiments. For example, the hardware components may include a general-purpose computer and/or an exclusive computing apparatus or a specific computing apparatus or a special feature or component of the specific computing apparatus. The processes may be implemented using at least one microprocessor having an internal and/or external memory, a microcontroller, an embedded microcontroller, a programmable digital signal processor or other programmable devices. In addition, or, as an alternative, the processes may be implemented using an application specific integrated circuit (ASIC), a programmable gate array, a programmable array logic (PAL), other devices configured to process electronic signals, or combinations thereof. In addition, targets of technical solutions of the disclosure or portions contributing to the arts may be configured in a form of program instructions executable through various computer components and stored in non-transitory computer-readable recording media. The media may include, alone or in combination with the program instructions, data files, data structures, and the like. The program instructions recorded in the media may be specially designed and configured for the example embodiments, or may be known to one of ordinary skill in the art of computer software and thereby available. Examples of the media may include magnetic media such as hard disks, floppy disks, and magnetic tapes; optical media such as CD-ROM discs, DVDs, and Blu-rays; magneto-optical media such as floptical disks; and hardware devices that are specially configured to store and perform program instructions, such as a ROM, a RAM, a flash memory, and the like. Examples of program instructions may include a higher language code computer-executable using an interpreter and the like as well as a machine language code and a bytecode, such as produced using structural programming languages such as C, object-oriented programming languages such as C++, and high or low programming languages (assembly languages, hardware technical languages, database programming languages and techniques), to run not only on one of the aforementioned devices but also a processor, a processor architecture, or a heterogeneous combination of combinations of different hardware and software components, or a machine capable of executing program instructions.

Therefore, according to an aspect of the disclosure, when the aforementioned methods and combinations thereof are performed by one or more computing apparatuses, the methods and the combinations thereof may be implemented as an executable code that performs the respective operations. According to another aspect, the methods may be implemented by systems that perform the operations and may be distributed over a plurality of devices in various manners or all of the functions may be integrated into a single exclusive, stand-alone device, or different hardware. According to another aspect, devices that perform the operations associated with the aforementioned processes may include the aforementioned hardware and/or software components. Such all of the sequences and combinations associated with the processes are to be included in the scope of the disclosure.

For example, the described hardware devices may be to act as one or more software modules in order to perform processing according to the above-described example embodiments, or vice versa. The hardware devices may include a processor, such as, for example, an MPU, a CPU, a GPU, and a TPU, configured to be combined with a memory such as ROM/RAM configured to store program instructions and to execute the instructions stored in the memory, and may include a communicator capable of transmitting and receiving a signal with an external device. In addition, the hardware devices may include a keyboard, a mouse, and an external input device for receiving instructions created by developers.

While this disclosure is described with reference to specific matters such as components, some example embodiments, and drawings, they are merely provided to help general understanding of the disclosure and the disclosure is not limited to the example embodiments. It will be apparent to one of ordinary skill in the art that various alterations and modifications in forms and details may be made from the example embodiments.

Therefore, the scope of the disclosure is not defined by the example embodiments, but by the claims and their equivalents, and all variations within the scope of the claims and their equivalents are to be construed as being included in the disclosure.

Such equally or equivalently modified example embodiments may include, for example, logically equivalent methods capable of achieving the same results as those acquired by implementing the method according to the example embodiments. Accordingly, the disclosure and the scope thereof are not limited to the aforementioned example embodiments and should be understood as a widest meaning allowable by law.

What is claimed is:

1. A communication control method performed by a controller, the communication control method comprising:
    receiving, from at least one of a first user terminal and a second user terminal, a first network generation request for a first network that connects the first user terminal and the second user terminal;
    in response to the first network generation request, transmitting a first network namespace generation request corresponding to at least one of the first user terminal and the second user terminal to a gateway;
    when a first network namespace is generated in the gateway in response to the first network namespace generation request, transmitting information about a first virtual interface to be allocated to the first network namespace to the gateway,
    when receiving, from at least one of a third user terminal and a fourth user terminal, a second network generation request for a second network that connects the third user terminal and the fourth user terminal, transmitting a second network namespace generation request corresponding to at least one of the third user terminal and the fourth user terminal to the gateway; and
    when a second network namespace is generated in the gateway, transmitting information about a second virtual interface to be allocated to the second network namespace to the gateway,
    wherein the first network namespace and the second network namespace are mutually distinct namespaces, wherein the first virtual interface is a (1-3)-th tunnel interface corresponding to at least one of a (1-1)-th tunnel interface generated in the first user terminal and a (1-2)-th tunnel interface generated in the second user terminal, wherein the second virtual interface is a (2-3)-th tunnel interface corresponding to at least one of a (2-1)-th tunnel interface generated in the third user terminal and a (2-2)-th tunnel interface generated in the fourth user terminal.

2. The communication control method of claim 1, further comprising:
providing a first routing table corresponding to the first network namespace to the gateway,
wherein the first routing table is allocated to the first network namespace.

3. A non-transitory computer-readable record medium storing a program comprising instructions configured to cause a computing apparatus to perform the method of claim 1.

4. A communication control method performed by a gateway, the communication control method comprising:
receiving, from a controller, a first network namespace generation request corresponding to a first network that connects a first user terminal and a second user terminal;
in response to the first network namespace generation request, generating a first network namespace;
receiving, from the controller, information about a first virtual interface corresponding to the first network namespace;
generating the first virtual interface;
allocating the first virtual interface to the first network namespace,
when receiving, from the controller, a second network namespace generation request corresponding to a second network that connects a third user terminal and a fourth user terminal, generating a second network namespace in response to the second network namespace generation request;
receiving, from the controller, information about a second virtual interface corresponding to the second network namespace;
generating the second virtual interface; and
allocating the second virtual interface to the second network namespace,
wherein the first network namespace and the second network namespace are mutually distinct network namespaces,
wherein the first virtual interface is a (1-3)-th tunnel interface corresponding to at least one of a (1-1)-th tunnel interface generated in the first user terminal and a (1-2)-th tunnel interface generated in the second user terminal, wherein the second virtual interface is a (2-3)-th tunnel interface corresponding to at least one of a (2-1)-th tunnel interface generated in the third user terminal and a (2-2)-th tunnel interface generated in the fourth user terminal.

5. The communication control method of claim 4, further comprising:
receiving, from the controller, a first routing table corresponding to the first network namespace; and
allocating the first routing table to the first network namespace.

6. A controller for performing a communication control method, the controller comprising:
a communicator; and
a processor,
wherein the processor is configured to
receive, from at least one of a first user terminal and a second user terminal, a network generation request for a first network that connects the first user terminal and the second user terminal,
in response to the received network generation request, transmit a first network namespace generation request corresponding to at least one of the first user terminal and the second user terminal to a gateway, and
when a first network namespace is generated in the gateway in response to the first network namespace generation request, transmit information about a first virtual interface to be allocated to the first network namespace to the gateway,
when receiving, from at least one of a third user terminal and a fourth user terminal, a second network generation request for a second network that connects the third user terminal and the fourth user terminal, transmit a second network namespace generation request corresponding to at least one of the third user terminal and the fourth user terminal to the gateway, and
when a second network namespace is generated in the gateway, transmit information about a second virtual interface to be allocated to the second network namespace to the gateway,
wherein the first network namespace and the second network namespace are mutually distinct namespaces,
wherein the first virtual interface is a (1-3)-th tunnel interface corresponding to at least one of a (1-1)-th tunnel interface generated in the first user terminal and a (1-2)-th tunnel interface generated in the second user terminal,
wherein the second virtual interface is a (2-3)-th tunnel interface corresponding to at least one of a (2-1)-th tunnel interface generated in the third user terminal and a (2-2)-th tunnel interface generated in the fourth user terminal.

* * * * *